(12) United States Patent
Janik (10) Patent No.: US 6,471,070 B2
(45) Date of Patent: Oct. 29, 2002

(54) ECOLOGICAL FUEL FILTER CARTRIDGE AND ELEMENT

(75) Inventor: Leon P. Janik, Suffield, CT (US)

(73) Assignee: Stanadyne Corporation, Windsor, CT (US)

( * ) Notice: Subject to any disclaimer, the term of this patent is extended or adjusted under 35 U.S.C. 154(b) by 0 days.

(21) Appl. No.: 09/785,789

(22) Filed: Feb. 16, 2001

(65) Prior Publication Data

US 2002/0014452 A1 Feb. 7, 2002

Related U.S. Application Data

(60) Provisional application No. 60/182,857, filed on Feb. 16, 2000.

(51) Int. Cl.[7] ............................................. B01D 35/34
(52) U.S. Cl. .................. 210/438; 210/444; 210/450; 210/454
(58) Field of Search ................................ 210/438, 443, 210/444, 450, 454

(56) References Cited

U.S. PATENT DOCUMENTS

| | | | | |
|---|---|---|---|---|
| 3,297,160 A | * | 1/1967 | Humbert, Jr. | 210/232 |
| 5,766,463 A | * | 6/1998 | Janik et al. | 210/232 |
| 5,783,078 A | * | 7/1998 | Roll et al. | 156/293 |

* cited by examiner

Primary Examiner—Matthew O. Savage
(74) Attorney, Agent, or Firm—Alix, Yale & Ristas, LLP (57) ABSTRACT

A fuel filter cartridge assembly employs a two piece housing to house a disposable, incineratable filter unit. The filter unit is constructed to cooperate with the sealing mechanism of the housing to seal the assembled cartridge against a fuel inlet/outlet conduit. Tabs formed on the filter unit end cap cooperate with slots formed in the housing to ensure that only compatible filter units are used.

12 Claims, 7 Drawing Sheets

ECOLOGICAL FUEL FILTER CARTRIDGE AND ELEMENT

REFERENCE TO RELATED APPLICATIONS

This application claims the benefit of U.S. provisional application No. 60/182,857, filed on Feb. 16, 2000.

BACKGROUND OF THE INVENTION

1. Field of the Invention

This invention relates generally to devices for filtering and separating fluids. More particularly, the present invention relates to fuel filters having a replaceable cartridge for removing foreign particles and separating water from the fuel supply system of an internal combustion engine.

2. Description of the Related Art

Diesel fuel supplies frequently contain significant quantities of abrasive particles and water which present the potential for permanent damage to the components of the fuel injection pump, the fuel delivery system and the engine. Consequently, an effective fuel filter as a practical necessity is conventionally incorporated into the fuel supply system of a diesel engine. A multitude of conventional fuel filters employ a disposable filter cartridge which is replaced at pre-established intervals of filter usage. Such fuel filters perform the dual function of removing particulate material from the diesel fuel and separating water from the fuel.

U.S. Pat. No. 4,976,852 and U.S. Pat. No. 5,084,170, which are assigned to the assignee of the present invention, disclose fuel filter assemblies to which the present invention relates. The fuel filters employ a base which mounts a disposable filter cartridge. In some disclosed embodiments, the cartridge includes a single stage filter system wherein fuel flows axially and radially to a filter element for removing particulate matter. The filter element also functions as a water barrier. Filtered fuel flows axially and exits through an outlet passage of the base. Water may be collected in a sump and periodically removed. The cartridge is secured to the base by a collar that engages a peripheral roll seam of the cartridge.

Most conventional fuel filter cartridges are permanently sealed metal canisters that contain a filter element and include grommets to seal the cartridge to the fuel inlet and outlet passages or ports. With use, the filter elements of such assemblies become clogged resulting in restricted fuel flow. The ability of the filter element to separate water also degrades over time. Accordingly, such cartridges must be replaced regularly to ensure the internal combustion engine is being supplied with an adequate flow of clean fuel.

Fuel filters have typically been constructed in the form of a metal can, permanently enclosing the filter element in a single use assembly. While these assemblies have proved to be effective and reliable, they are less than ideal in terms of waste of materials and disposal cost. Increased awareness of environmental protection and recycling of materials have led to a need for more efficient filtration systems having a minimum disposable component. In addition, environmental protection agencies seeking to reduce the volume of waste items associated with the automotive and trucking industries no longer allow used fuel filters into the normal waste stream, necessitating specialized and consequently more expensive disposal.

SUMMARY OF THE INVENTION

Briefly stated, the invention in a preferred form is a fuel filter cartridge assembly which includes a two-part housing containing a single use, incineratable filter unit. The housing is constructed of first and second cooperative sections, detachably connected to allow replacement of the used filter unit. The filter unit is constructed of a continuous, fan shaped, pleated filter element, typically composed of a form of paper. Axially spaced first and second end caps, constructed of incineratable plastic, provide support structure for the filter element and also provide a platform for the attachment of grommets which seal the unit to the fuel inlet/outlet conduit.

The can-shaped housing first section defines a central axial opening for receiving a typically coaxial fuel inlet/outlet conduit projecting from a cartridge-receiving base module. A sealing grommet is affixed to the inner edge of the opening for fluidly sealing the housing to the received conduit. The interior surface of the housing first section preferably incorporates at least one groove which is cooperative with tabs formed on the first end cap of the filter unit. The cooperative groove and tab structures function as a key system to prevent the use of incompatible filter elements in a particular housing.

The filter unit interacts with the housing grommet in a novel manner. The housing grommet has a quasi-tubular structure that extends into the housing a short axial distance and terminates at a second end. In a preferred embodiment, the housing grommet second end has at least one radially extending protrusion which functions as a locator and a retainer ring to ensure proper axial positioning and sealing of the filter unit within the housing.

The housing grommet is configured to cooperate with a complementary structure located in the filter element first end cap. The central opening in the first end cap is defined by an inwardly projecting shoulder having an interior diameter less that the external diameter of the grommet protrusion. The shoulder is located axially so that when the filter element is installed within the housing, this shoulder rides over the protrusion and exerts a radially inward force on an axially intermediate area of the sealing grommet, forcing the grommet into sealing contact with the exterior surface of the fuel conduit.

An ecological fuel filter element according to the present invention provides a filter element which lessens the potential impact of fuel filter replacement on the environment by removing fuel and solid waste from the waste stream. A filter element constructed according to the claimed invention will contain no metal and will be composed of incineratable materials.

The claimed invention removes the filter cartridge housing from the waste stream by making it possible to open the housing and replace only the used filter element. Fuel inside the housing can be collected and re-cycled immediately. The filter element and its trapped particulates can then be destroyed efficiently by incineration. Using this technique will ease compliance with increasingly strict environmental protection requirements while greatly reducing disposal costs.

An object of the invention is to provide a new and improved fuel filter cartridge and element which enable the cost effective disposal of the spent element in an efficient, environmentally friendly process.

Another object of the invention is to provide a new and improved fuel filter cartridge assembly of efficient and low cost construction which reduces waste and controls the release of fuel contaminants into the environment.

A further object of the invention is to provide a new and improved disposable fuel filter element which can be efficiently installed and replaced and functions to enhance the sealing integrity of the filter assembly.

A yet further object of the invention is to provide a new and improved fuel filter element which can be disposed of in a cost-effective manner which is compliant with strict environmental regulations.

Other objects and advantages of the invention will become apparent from the drawings and the specification.

DETAILED DESCRIPTION OF THE PREFERRED EMBODIMENTS

With reference to the drawings, wherein like numerals represent like parts throughout the figures, a fuel filter cartridge assembly in accordance with the present invention is generally designated by the numeral 10. The fuel filter cartridge assembly 10 includes a cylindrical housing having a first end 12 threadably engaged with and sealed to a second end 14. The housing surrounds and retains a filter element 30. The housing second section 14 may preferably be equipped with a drain cock 18.

Figure 9:
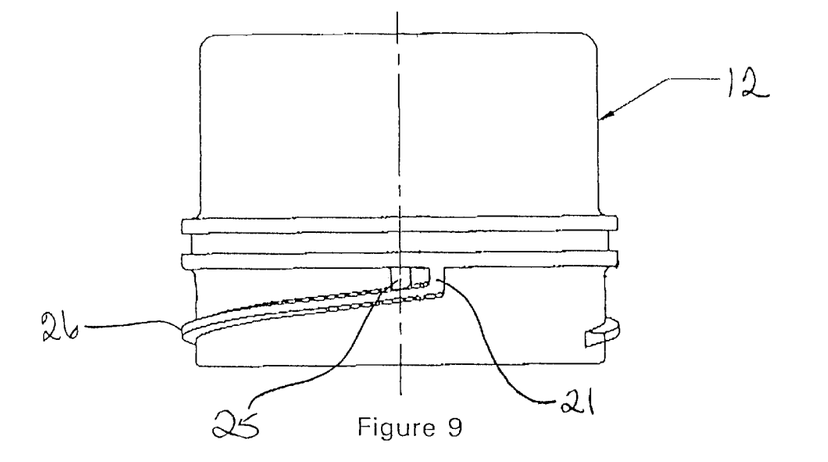
FIG. 9 is a side elevational view of the housing first section of FIGS. 4 and 5.
Figure 10:
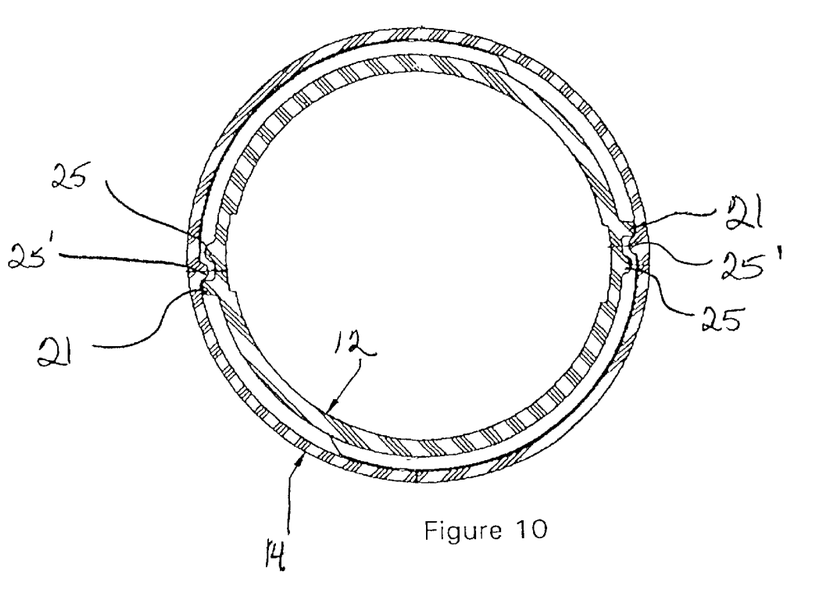
FIG. 10 is a cross sectional view through a fuel filter cartridge assembly housing with the filet unit removed for clarity.

Details of the configuration of the housing first section 12 are illustrated in FIGS. 4, 5, 9 and 10. The housing first section includes a first end 13 that defines a central opening 16 for receiving a conduit. An axially spaced second end 15 includes threads 26 for engagement of the housing second section 14. Complementary threads 26', 26 project from the housing first and second sections, respectively. With reference to FIGS. 9 and 10, each housing section 12, 14 includes a retainer bump 25, 25' located so that the housing sections must deform to permit one bump to ride over the other as the housing sections rotate relative to each other. The housing first section 12 includes a stop 21 arranged to define the fully engaged position of the threaded connection. Retaining bump 25 rides over retaining bump 25' and then encounters the stop 21. In practice, this arrangement results in a positive "snap" indicating a fully engaged position. The housing unit sections are retained in a fixed relationship relative to each other until the retaining bumps are disengaged.

The interior surface of the housing first section 12 defines slots 24 configured to receive complementary tabs 38 formed on the filter unit 30. Only a filter unit 30 having correctly configured tabs 38 will be received in the housing first section 12 ensuring that the proper filter unit is used for a given application.

A housing grommet 20 is located in the housing first section 12 central opening 16. The unique configuration of the housing grommet 20 serves two functions: first, the housing grommet 20 interacts with the filter unit 30 first end cap 34 to axially retain and seal the filter unit 30 within the housing first section 12; and second, the housing grommet 20 seals the cartridge assembly 10 to a received fuel inlet/outlet conduit projecting into the housing from the base module 60. The housing grommet 20 has a quasi-tubular configuration which extends axially within the housing and includes at least one radially extending protrusion 22 at its axially spaced second end. The first end of the tubular housing grommet 20 is engaged with the interior rim of the central opening 16 in the first end 13 of the housing first section 12.

The second section 14 of the housing includes threads 26 for engagement of the housing first section 12. A seal 28 is preferably placed between housing first section 12 and housing second section 14 to improve the fluid sealing qualities of the threaded joint between the two housing sections. The housing second section 14 also includes a roll seam structure 27 which will be engaged by a collar 62 to retain the cartridge assembly 10 in mated position with a base module 60. The housing second section 14 is preferably equipped with a drain cock 18 which is typically used for draining water separated from the fuel by the filter element 32. In the ecological fuel filter cartridge assembly 10, the drain cock 18 will also serve the function of draining fuel from the housing in preparation for separation of the housing sections 12, 14.

The filter unit 30 includes a generally continuous filter element 32, a first end cap 34 and a second end cap 36. The filter element 32 is a fan-folded paper element in the form of a cylinder which typically filters particulates and separates water from the fuel. The end caps 34, 36 enclose the axially spaced ends of the filter element and provide structure to the paper element. The end caps 34, 36 have a configuration which seals to and mounts within the cartridge housing.

Figure 6:
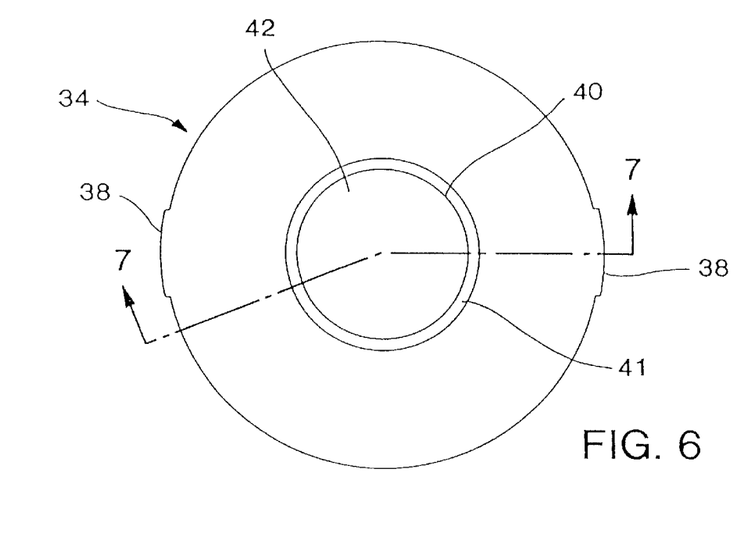
FIG. 6 is a top plan view of a filter unit end cap in accordance with the present invention.
Figure 7:
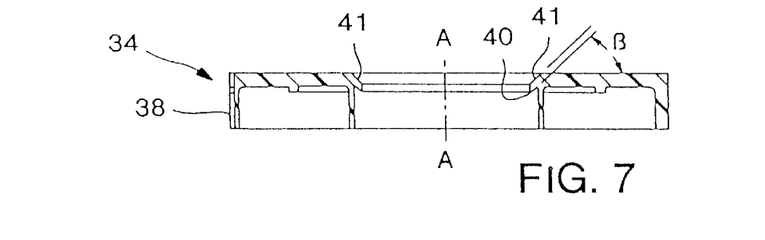
FIG. 7 is a cross sectional view of the filter unit end cap of FIG. 6 taken along the line 7—7 thereof.
Figure 8:
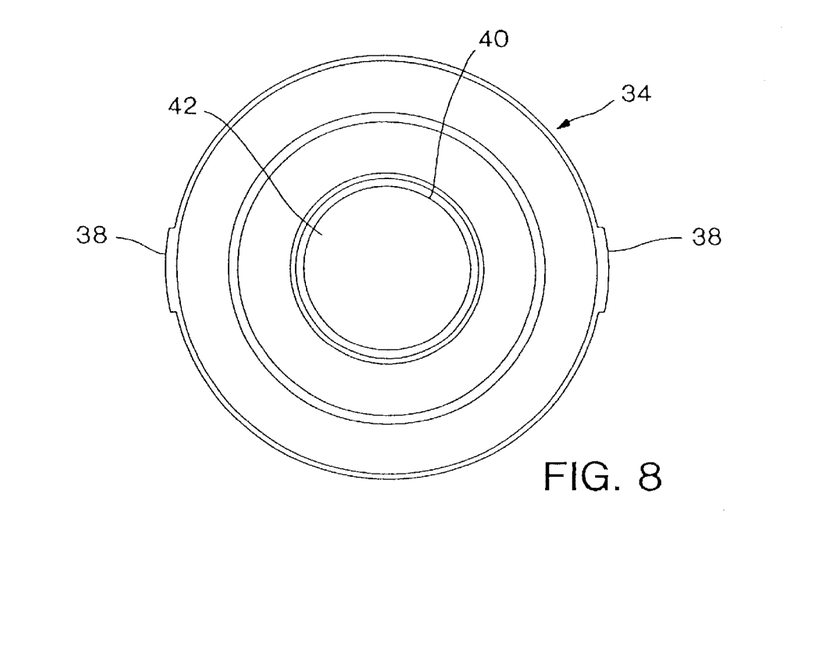
FIG. 8 is a bottom plan view of the filter unit end cap of FIG. 6.

Details of the configuration of the filter unit 30 first end cap 34 are best understood with reference to FIGS. 6–8. The first end cap 34 includes a radially inwardly extending shoulder 40 defining a central opening 42 configured for receiving the axially extending tubular portion of the housing grommet 20. The outer circumference of the first end cap 34 includes radially extending tabs 38 configured to engage the slots 24 defined by interior surface of the housing first section 12. The arrangement of the tabs 38 and the slots 24 assures that only compatible filter units will mate with a given housing, ensuring a properly configured cartridge assembly 10 and an ecologically compliant replacement filter unit.

The shoulder 40 projects radially inward at an acute angle to a central axis A passing through the filter unit 30 forming an angled conical surface 41. The shoulder projects at an angle $\beta$, which is preferably approximately 45° relative to the central axis A.

Figure 1:
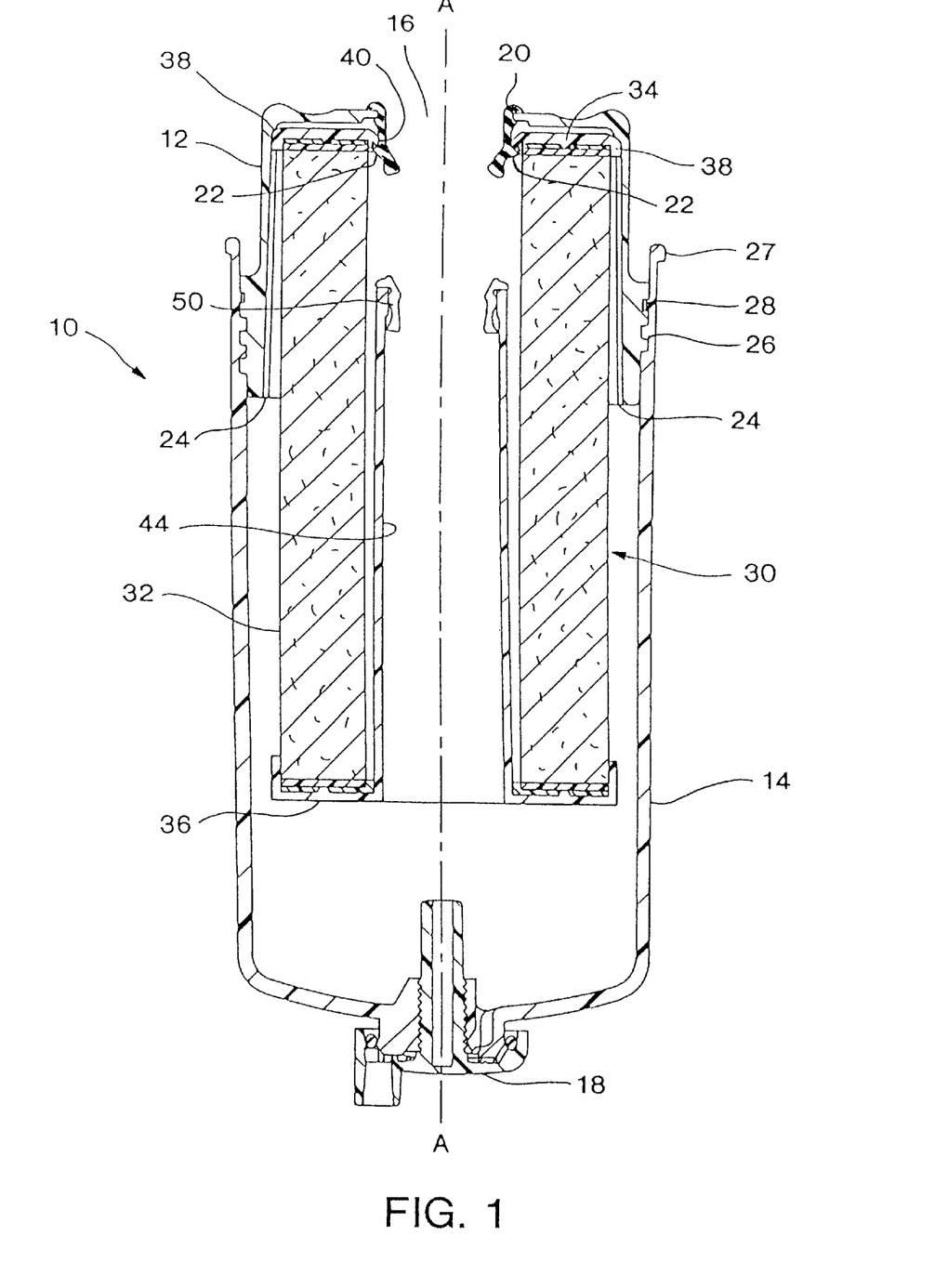
FIG. 1 is a cross sectional view of an ecological fuel filter cartridge assembly in accordance with the present invention.

The filter unit 30 second end cap 36 encloses the axially spaced end of the filter element 32 in a manner similar to the first end cap 34. In a typical embodiment of a filter unit 30, for use in a filter assembly having a standard fuel flow path, the filter unit 30 second end cap 36 includes a tubular axial projection 44 (see FIG. 1) extending toward the first end cap 34. The tubular extension 44 terminates in a structure configured to engage and retain a sealing grommet 50.

Figure 1A:
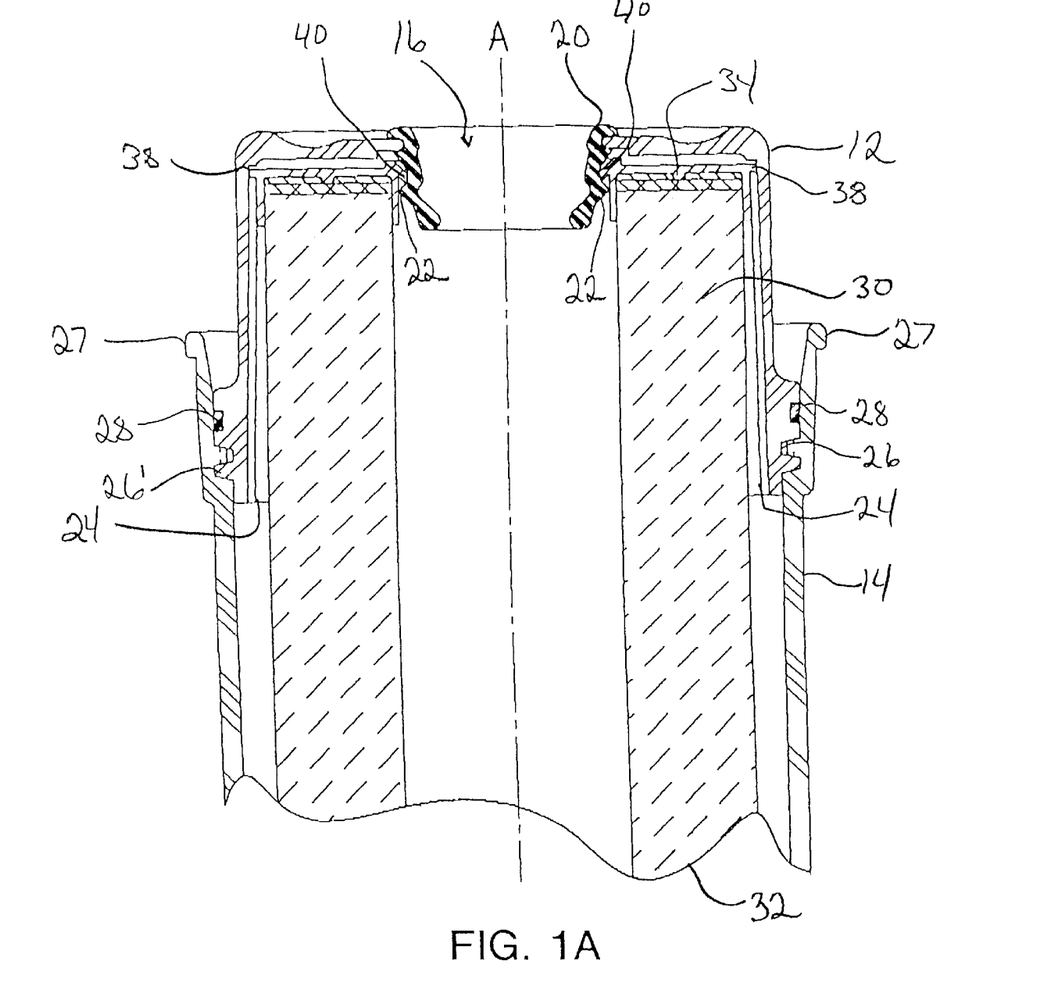
FIG. 1A is an expanded cross sectional view of the ecological fuel filter cartridge assembly of FIG. 1 (partially illustrated)

To better understand the functional relationships between the structures of the filter unit 30 and the housing sections 12 and 14, reference is now made to FIG. 1A. The tabs 38 are aligned with the axially extending slots 24 defined by the interior surface of the housing first section 12. The filter unit 30 is inserted toward the first end 13 of the housing first section 12. As the filter unit 30 approaches the first end 13 of the housing first section 12, the radially inward projecting shoulder 40 of the filter unit 30 first end cap 34 engages the axially extending tubular portion of the housing grommet 20. The angled conical surface 41 formed by the angular projection of the shoulder 40 aids in allowing the shoulder 40 to ride over the radially extending protrusions 22 of the grommet 20.

When the filter unit 30 has been fully received in the housing first section 12, the radially extending shoulder 40 is axially positioned to engage an intermediate portion of the housing grommet 20, exerting a radially inward force on that intermediate portion. The filter unit 30 is thus captured and retained by the first section 12 in a generally fixed axial position relative to the housing first section. The housing second section 14 is then threadably engaged with the housing first section 12 forming a sealed cylindrical enclosure around the filter unit 30.

Figure 2:
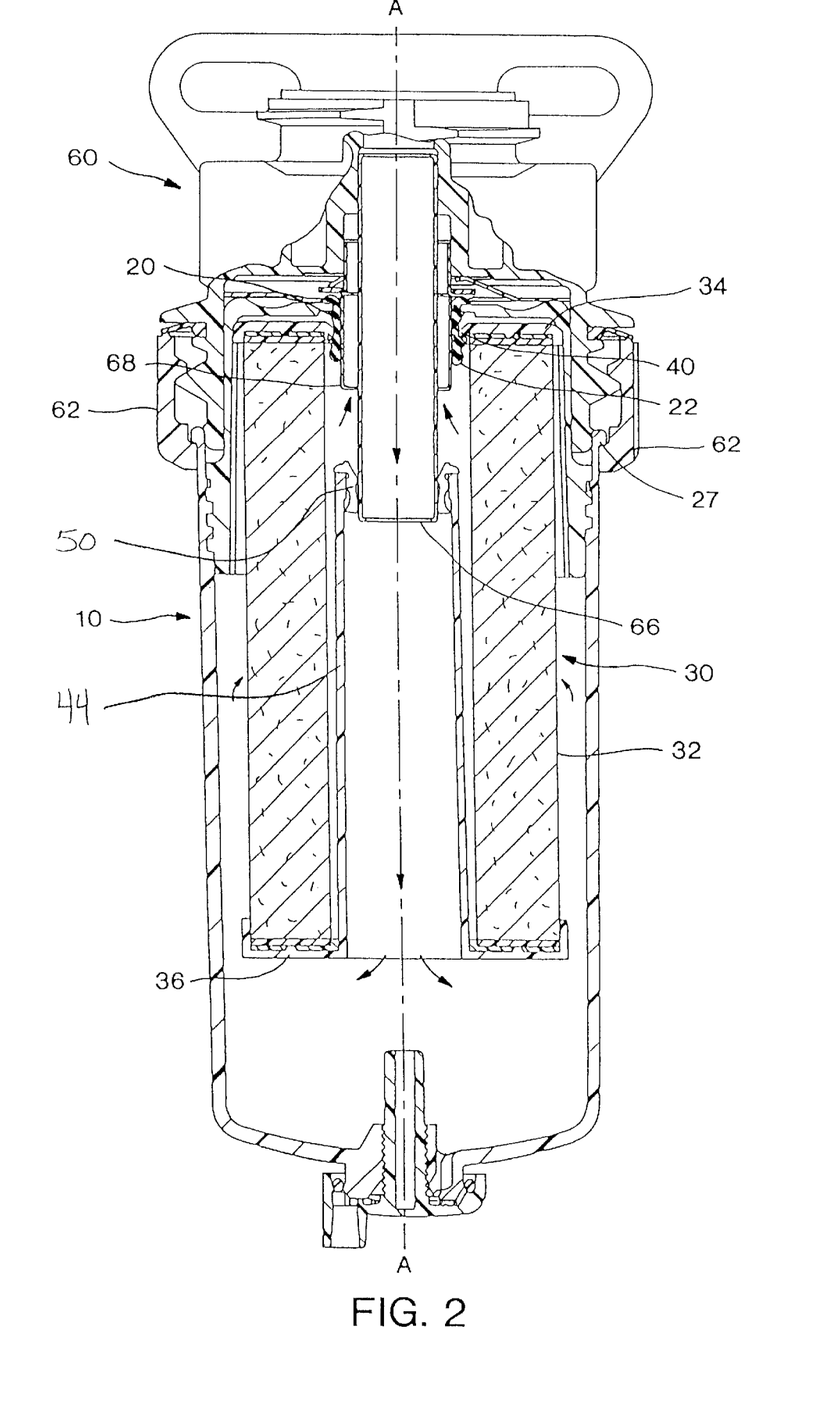
FIG. 2 is a cross sectional view of the ecological fuel filter cartridge assembly of FIG. 1 mounted to a base module.

The ecological fuel filter cartridge assembly 10 may now be installed on a filter base module 60 as illustrated in FIG. 2. The filter base module 60 forms a receptacle for receiving the fuel filter cartridge assembly 10. A co-axial fuel inlet/outlet conduit projects from the filter base module 60 into the fuel filter cartridge assembly 10 through the central opening 16 in the housing first section 12. The fuel inlet/outlet conduit includes an inlet conduit 66 surrounded by a co-axial outlet conduit 68. In a preferred configuration, the inlet conduit has a greater axial length than the outlet conduit 68. A threaded collar 62 passes over the fuel filter cartridge assembly 10 and engages the molded peripheral lip 27 extending from the housing second section 14. The collar 62 threadably engages complementary threads on the filter base module 60, retaining the fuel filter cartridge assembly 10 in a stable mated position with the filter base module 60. The base module 60 and collar 62 prevent the housing sections 12, 14 from deforming and make it impossible for the two housing sections 12, 14 to disengage from each other. A gasket or 0-ring 28 is positioned between the two housing sections.

FIG. 2 illustrates a base module 60 and associated fuel filter cartridge assembly 10 utilizing a standard flow of fuel through the filter element 32. In this configuration the greater axial length of the fuel inlet conduit 66 provides an end location which is engaged by a grommet 50 retained on the tubular axial projection 44 of the filter unit second end cap 36. The sealed engagement between the fuel inlet conduit 66 and the tubular axial projection 44 forms a fuel inlet path directing fuel axially into the housing second section where it flows radially and axially to the filter element 32 in the general direction of the FIG. 2 arrows. Passing radially through the filter element 32, the filtered fuel then flows generally axially into the fuel outlet conduit 68.

Figure 3:
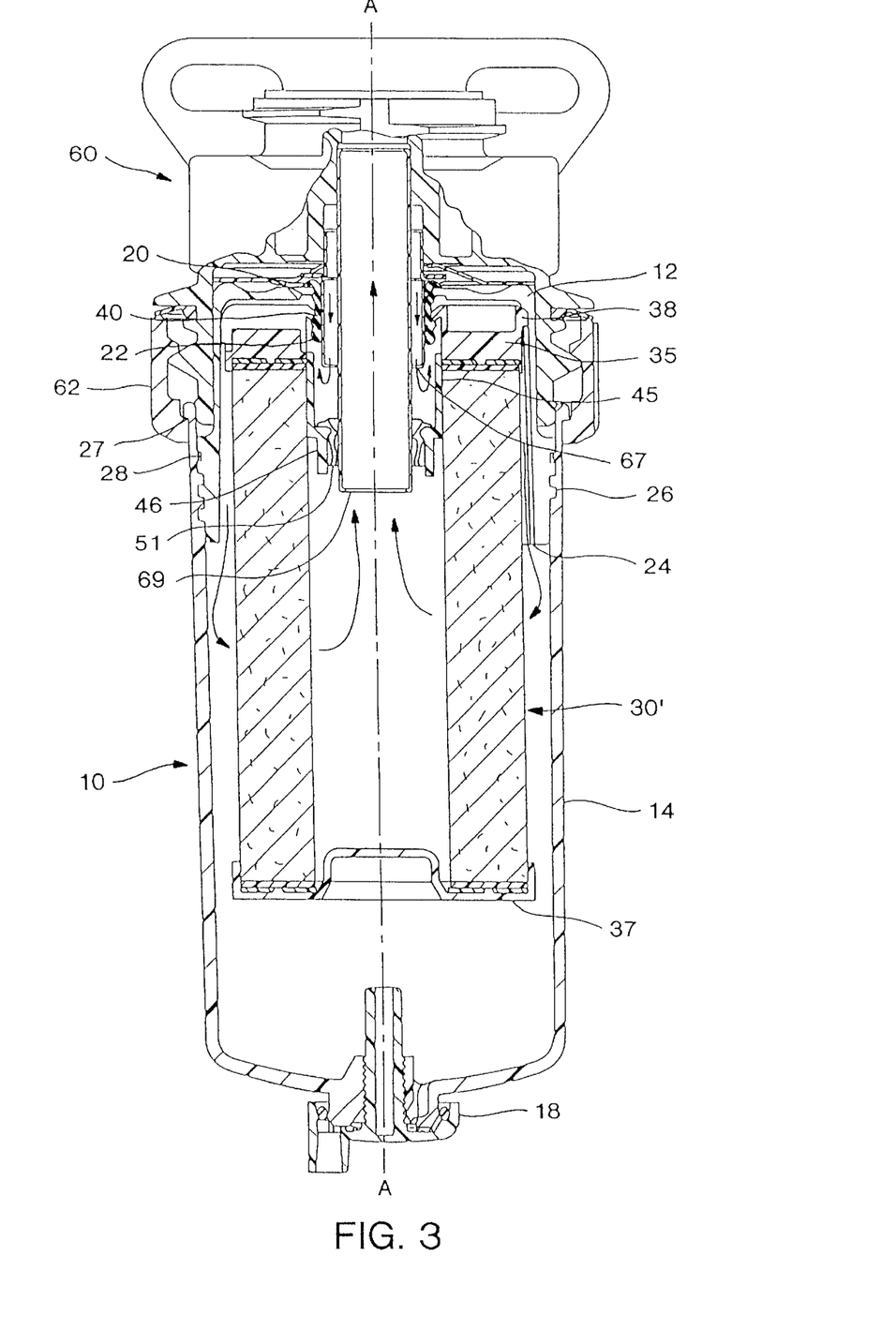
FIG. 3 is a cross sectional view of an ecological fuel filter cartridge assembly utilizing an alternative embodiment of a filter unit in accordance with the present invention mounted to a base module.
Figure 4:
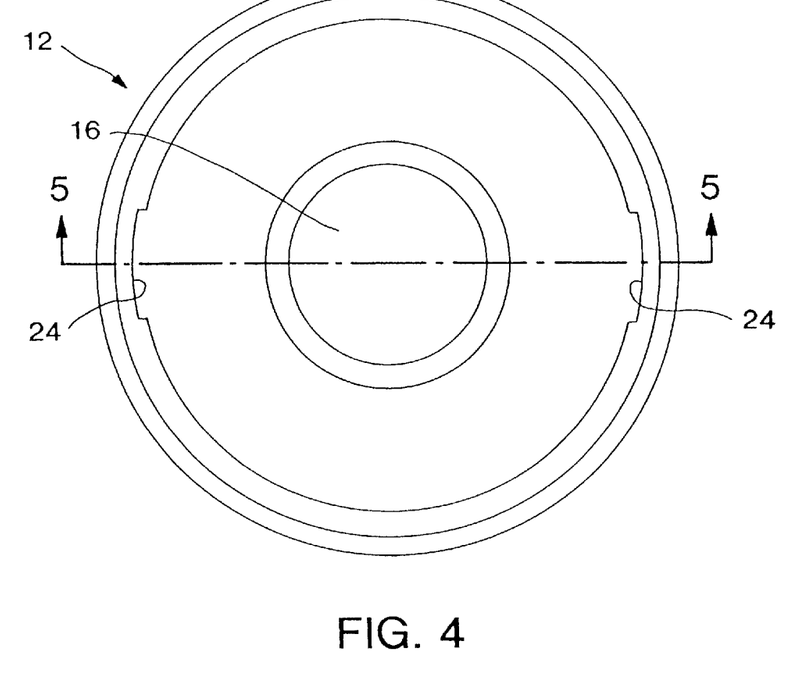
FIG. 4 is a bottom plan view of an ecological fuel filter cartridge assembly housing first section in accordance with the present invention.
Figure 5:
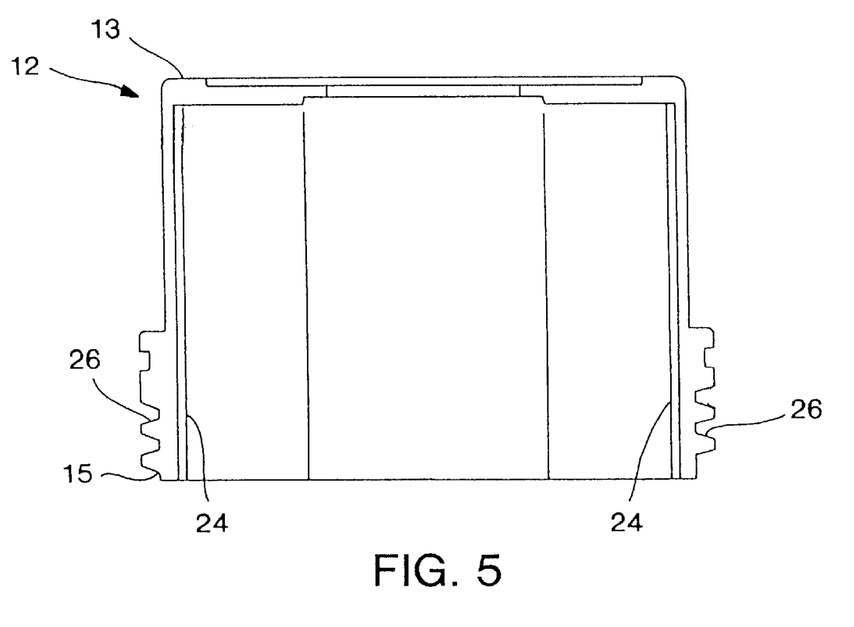
FIG. 5 is a cross sectional view of the ecological fuel filter cartridge assembly housing first section of FIG. 4 taken along the line 5—5 thereof.

A reverse fuel flow path can be achieved utilizing an alternative embodiment of the filter unit as illustrated in FIG. 3. The reverse flow path is generally illustrated by the FIG. 3 arrows. A reverse flow filter unit 30' utilizes a second end cap 37 having no tubular projection or central opening. Instead, filter unit 30' first end cap 35 incorporates a tubular axial projection 45 and sealing grommet 51 which extends toward filter unit 30' second end cap 37. The tubular projection 45 and sealing grommet 51 engage the inner axially extended fuel conduit 69, which in this embodiment serves as the fuel outlet conduit. Fuel enters the cartridge assembly 10 via the outer, shorter fuel inlet conduit 67 where it flows radially and axially to the filter element 32. The fuel passes radially through the filter element 32 and then flows generally axially to the fuel outlet conduit 69. Thus, a reverse flow can be accomplished with the same filter base module 60 and housing 12, 14 by utilization of the filter unit 30'.

In either the embodiment illustrated in FIG. 2, or the embodiment illustrated in FIG. 3, the sealing grommet 50, 51 serves to separate filtered (clean) from unfiltered (dirty) fuel by engaging both the filter unit and the axially extending fuel conduit. Similarly, in either configuration an intermediate portion of the housing grommet 20 is engaged by the radially inward extending shoulder 40 of the filter unit first end cap 34, 35. The shoulder 40 exerts a radially inward force on the intermediate portion of the grommet 20 urging it into sealing engagement with the exterior surface of the fuel inlet/outlet conduit. The retaining collar 62 connects the fuel filter cartridge assembly 10 to the filter base module 60 and urges the housing grommet 20 into axial contact with the filter base module, further enhancing sealing between the fuel filter cartridge assembly 10 and the filter base module 60.

In either configuration, the fuel filter cartridge assembly 10 may be removed from the filter base module 60 by removing the threaded collar 62. Prior to removal, the drain cock 18 may be utilized to drain fuel from the fuel filter cartridge assembly 10 to avoid the spillage of fuel. Once removed from the filter base module, the fuel filter housing sections 12, 14 may be separated and the filter unit 30, 30' removed and replaced with a new filter unit 30, 30'. The housing sections 12, 14 are then reassembled into a sealed unit which is then reinstalled in the filter base module 60. A filter unit 30, 30' in accordance with the present invention contains no metal and is constructed of incineratable materials. The spent filter unit may be efficiently disposed of via incineration, reducing the waste stream. All fuel is either drained and recycled or combusted with the used filter unit 30, 30'.

Preferred filter element materials are paper and paper products containing synthetic fibers. A preferred material for the end caps is cross-linked polyethylene. The polyethylene may be a high density polyethylene, such as HDPE. Such polyethylene plastics provide a desirable combination of corrosion resistance and strength. Other plastics common to automotive uses may also be appropriate, such as nylon or glass filled nylon. An incineratable adhesive, such as Plastisol™, is used to join the filter element to the end caps to form the filter unit, 30, 30'. The resulting filter unit does not add any materials to the waste stream that are not already present. The filter unit components will burn with a relatively high energy value (BTU/Pound) that may be recovered for power generation or other useful purpose.

Thus, the ecological fuel filter cartridge assembly 10 and filter unit 30 allow the frequent replacement of fuel filters while greatly reducing the risk of fuel entering the environment via used filter cartridges and significantly reducing the volume of waste and cost of disposal typically associated with such replacement.

While preferred embodiments of the foregoing invention have been set forth for purposes of illustration, the foregoing descriptions should not be deemed a limitation of the invention herein. Accordingly, various modifications, adaptations and alternatives may occur to one skilled in the art without departing from the spirit and the scope of the present invention.

What is claimed is:

1. A fuel filter cartridge assembly comprising:

housing means for forming a housing including a first section having a first end defining an opening for receiving a conduit, and a second section, means for removably connecting said sections to form a fluid-tight enclosure, and a sealing grommet disposed for fluidly sealing said first section to said conduit upon reception in said opening, said grommet having axially spaced first and second ends, and interior and exterior surfaces, the grommet first end exterior surface engaging said opening, said grommet second end disposed in said housing and having at least one radially extending protrusion of said exterior surface; and filter means for filtering fuel replacably receivable in said housing and comprising a filter element having a radially interior first filter surface and a radially exterior second filter surface and axially spaced first and second end caps enclosing the axial ends of said filter element, said first end cap including a radially inward extending shoulder defining an opening for receiving said grommet, said shoulder having an interior diameter less than an external diameter of said grommet protrusion and having an axial location permitting engagement of an axially intermediate portion of said grommet, wherein said filter means is installable within said housing means whereby said shoulder rides over said protrusion and engages said axially intermediate portion of said grommet so that said shoulder exerts a radially inward force on said grommet and said protrusion exerts an axial retention force on said shoulder.

2. The fuel filter cartridge assembly of claim 1, wherein said conduit includes inlet and outlet coaxial tubes, said outlet tube surrounding said inlet tube and said inlet tube extending a greater axial distance than said outlet tube, and said second end cap comprises an opening co-axial with said first end cap opening, said second end cap opening defined by sealing means for fluidly sealing said second end cap to said inlet tube upon reception in said opening.

3. The fuel filter cartridge assembly of claim 1, wherein said conduit includes inlet and outlet coaxial tubes, said inlet tube surrounding said outlet tube and said outlet tube extending a greater axial distance than said inlet tube, and said first end cap comprises a tubular projection extending toward said second end cap and including sealing means for fluidly sealing to said outlet tube, said projection being coaxial with said first end cap opening and surrounding said outlet tube in spaced relationship thereto.

4. The fuel filter cartridge assembly of claim 1, wherein said assembly has a central axis and said shoulder extends axially toward said second end cap at an acute angle to said axis.

5. The fuel filter cartridge assembly of claim 1, wherein said first end cap comprises a generally circular external circumference having at least one radially extending tab and said housing means first section comprises a generally cylindrical interior surface having axial at least one slot configured to axially receive said at least one radially extending tab.

6. The fuel filter cartridge assembly of claim 1, wherein upon reception of said conduit in said first section opening, said conduit exerts a radially outward force on said grommet, said outward force being counter to said radially inward force exerted by said shoulder, whereby said shoulder is constrained from moving axially over said protrusion away from said first section first end.

7. A filter cartridge assembly comprising:

a housing including a first section having a first end defining an opening for receiving a conduit, and a second section, said sections removably connectable to form a fluid-tight enclosure, and a sealing grommet disposed for fluidly sealing said first section to said conduit upon reception in said opening, said grommet having axially spaced first and second ends, and interior and exterior surfaces, the grommet first end exterior surface engaging said opening, said grommet second end disposed in said housing and having at least one radially extending protrusion of said exterior surface; and a filter unit replacably receivable in said enclosure and comprising a generally continuous filter element and axially spaced first and second end caps enclosing the axial ends of said filter element, said first end cap including a radially inward extending shoulder defining an opening for receiving said grommet, said shoulder having an interior diameter less than an external diameter of said grommet protrusion and having an axial location permitting engagement of an axially intermediate portion of said grommet, wherein said filter unit is installable within said enclosure whereby said shoulder rides over said protrusion and engages said axially intermediate portion of said grommet so that said shoulder exerts a radially inward force on said grommet and said protrusion exerts an axial retention force on said shoulder.

8. The filter cartridge assembly of claim 7, wherein said conduit includes inlet and outlet coaxial tubes, said outlet tube surrounding said inlet tube and said inlet tube extending a greater axial distance than said outlet tube, and said second end cap comprises an opening co-axial with said first end cap opening, said second end cap opening defined by a grommet for fluidly sealing said second end cap to said inlet tube upon reception in said opening.

9. The filter cartridge assembly of claim 7, wherein said conduit includes inlet and outlet coaxial tubes, said inlet tube surrounding said outlet tube and said outlet tube extending a greater axial distance than said inlet tube, and said first end cap comprises a tubular projection extending toward said second end cap and including a grommet for fluidly sealing to said outlet tube, said projection being coaxial with said first end cap opening and surrounding said outlet tube in spaced relationship thereto.

10. The filter cartridge assembly of claim 7, wherein said assembly has a central axis and said shoulder extends axially toward said second end cap at an acute angle to said axis.

11. The filter cartridge assembly of claim 7, wherein said first end cap comprises a generally circular outer circumference having at least one radially extending tab and said housing first section comprises a generally cylindrical interior surface having axial at least one slot configured to axially receive said at least one radially extending tab.

12. The filter cartridge assembly of claim 7, wherein upon reception of said conduit in said first section opening, said conduit exerts a radially outward force on said grommet, said outward force being counter to said radially inward force exerted by said shoulder, whereby said shoulder is constrained from moving axially over said protrusion away from said first section first end.

* * * * *